J. C. MILLIGAN.
Coffee Mill.

No. 105,966.          Patented Aug. 2, 1870.

Witnesses:
Alex F. Roberts
L. S. Mabee

Inventor:
J. C. Milligan
Per Munn & Co.
Attorneys.

J. C. MILLIGAN.
Coffee Mill.

No. 105,966. Patented Aug. 2, 1870.

United States Patent Office.

JOHN C. MILLIGAN, OF BROOKLYN, NEW YORK.

Letters Patent No. 105,966, dated August 2, 1870.

IMPROVEMENT IN COFFEE-MILLS.

The Schedule referred to in these Letters Patent and making part of the same

To all whom it may concern:

Be it known that I, JOHN C. MILLIGAN, of Brooklyn, in the county of Kings and State of New York, have invented a new and useful Improvement in Coffee-Mills; and I do hereby declare that the following is a full, clear, and exact description thereof, which will enable others skilled in the art to make and use the same, reference being had to the accompanying drawing forming part of this specification.

This invention relates to improvements in coffee-mills of the class known as box-mills; and It consists—

First, in the arrangement of the nut-holding dog and spring, with the handle detachably connected to the top of the spindle, and with the nut thereon, for adjusting the spindle for grinding fine or coarse, the said arrangement being intended to facilitate the adjustment, and to admit of readily detaching the handle for packing.

Second, in an arrangement of the box-hopper, fixed grinding-cone, and the lower cross-bar, for connection all together, by two or more screws or bolts, in a simple and permanent way, requiring little or no adjustment.

Third, in an arrangement of the grinding-cone and the shell relatively to each other, and of the furrows of each, calculated to facilitate the feeding or working of the whole grain into the space where it is first received and acted upon.

Figure 3 is a side elevation of the revolving grinding-cone.

Similar letters of reference indicate corresponding parts.

Figure 1:
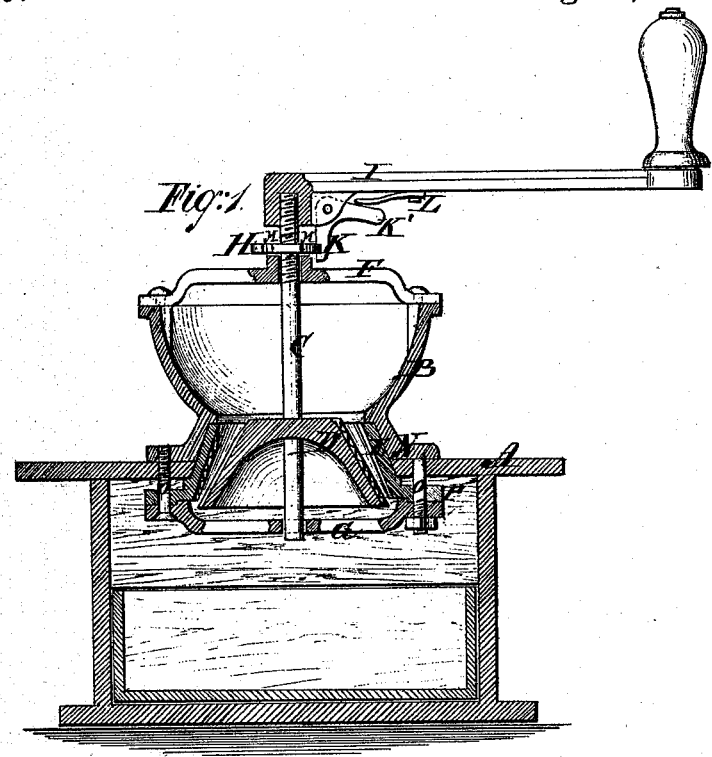
Figure 1 is a sectional elevation of my improved mill.
Figure 2:
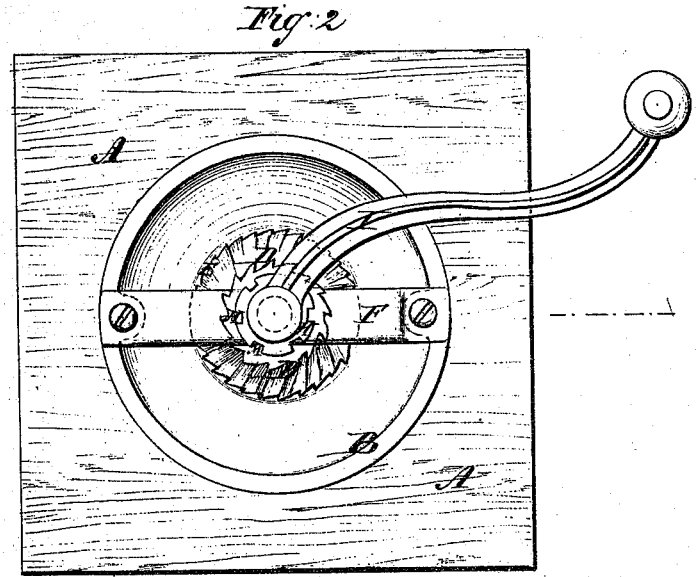
Figure 2 is a plan view of the same.
Figure 5:
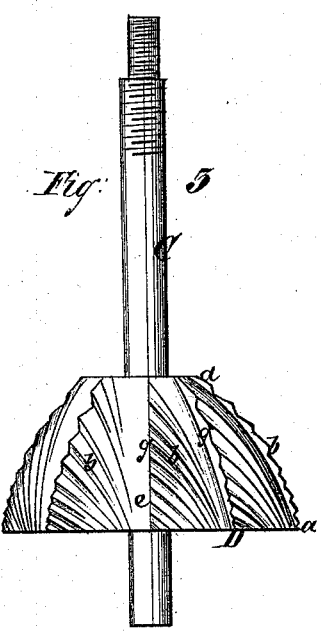
Figure 4:
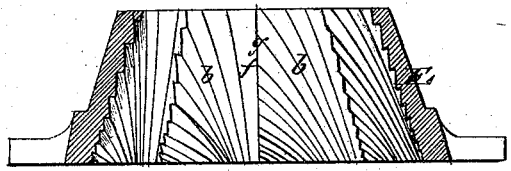
Figure 4 is a section of the shell.

A represents the box;

B, the hopper;

C, the spindle for the support of the revolving grinder;

D, the said grinder; and

E is the shell, in connection with which the grinder D works.

The spindle is mounted in vertical bearings in the upper cross-bar F, and, the lower one, G, passing through both, it is vertically supported by the nut H screwing up and down on it, and resting on the top of the cross-bar F.

I is the handle, attached to the top of the spindle by a screw-threaded socket screwing down thereon, the said socket being on the side of the handle at one end, and the screw-threads being pitched so that the handle screws on when turning in the direction of grinding.

The nut H is employed for raising or lowering the spindle, to adjust the cone D for grinding fine or coarse; and the handle I is provided with a holding-pawl, K, for engaging in notches, M, in the edge of the nut, the said pawl being provided with a spring, L, for keeping it in the notches, and with a finger-piece, K', for tripping the nut. The pawl and spring are connected to the handle.

These spindles C have been similarly arranged for vertical adjustment in a cross-bar, F, by a nut, G, having a spring-holding pawl rigidly attached to the top of the spindle, to which the crank was also permanently attached.

It is highly important for packing economically that the handles be so arranged that they may be readily detached, and it is also important that the pawl may be readily and conveniently tripped out of the notches in the nut, both for adjusting the latter, and for detaching the handle. I have, therefore, provided this arrangement of the handle for attaching to the spindle by a screw-threaded socket, and the holding-pawl K pivoted to it, as shown, and provided with the finger-piece K', so placed that it may be tripped in the most convenient way by the first finger of the hand when grasping the handle.

The bottom N of the hopper rests on the top of the box, and has ears for the attaching-bolts or screws O.

The hollow shell E fits up through the top of the box into the conical part of the hopper, and is also provided with ears, P, for the bolts, and the cross-bar G is fitted at the ends against the under side of the ears P. The whole is then connected together by the bolts or screws O, which, being once permanently screwed up, require little or no attention or adjustment, firmly securing all the points of the mill together.

In order to prevent the throwing back of the grains, which occurs in other mills to a considerable extent by reason of the action of the projecting ribs at the upper end of the cone, and also to facilitate the cracking of the grains at the top while grinding firmly and uniformly at the bottom, I propose to arrange the shell E on straight lines from bottom to top, and the cone D I make in the curved form represented in fig. 3, to provide space at the top to admit the whole grains, the said curvature being on a greater radius from $a$ to $b$, where the reduction of the grains is more rapid than between the points $b$ $a$, where the finishing operation is performed.

As a further means of improving the cracking and grinding qualities of the cone D and shell E, also for working the grains into the space between them, I make long furrows, $e$, across the face from top to bottom in lines parallel with the axis of the spindle, and having one wall, $g$, perpendicular thereto. The said furrows are deep and wide at the top, gradually narrowing and shallowing toward the bottom. They are designed to be so broad at the top that the sections of grinding-surface between them will terminate in a point thereat, making ample room for the admission of the grains.

The sections of surface between these large furrows are provided with oblique grooves, beginning at the walls $g$ of the furrows $e$, and curving rearward and downward, as in other mills.

The shell E is provided with similar furrows, $f$, but not as wide and deep as the furrows $e$, and the spaces between are similarly grooved.

I am aware that furrows of like character to these furrows $e$ and $f$ have been arranged in other mills, but arranged so that the furrows of the cone and shell cross each other, so as to have a shearing action upon the grain, forcing it downward; and these inclinations of the furrows have been greater near the top than further downward. This arrangement has been adopted in other mills mainly because of the want of capacity to work the grains in fast enough at the top; but while it facilitates that operation, it is decidedly objectionable in the respect that the action of the walls $g$ of the furrows is not as effective as when made parallel with the axis of the spindle, in which case the direction of the forces acting on the grain is in the shortest lines between the walls of the two opposing furrows.

I have found in practice that, with the facility afforded by my arrangement of the wide spaces at the top for the ready admission of the grain, it is only necessary, in order to have sufficient downward draft, to arrange the small furrows $h$ obliquely, thus admitting of the arrangement of the furrows $e$ and $f$ as described, which, as before stated, greatly increases the grinding capacity and uniformity of the coffee or spice when ground.

Having thus described my invention,

What I claim as new, and desire to secure by Letters Patent, is—

1. The combination and arrangement of the spindle C, adjusting-nut H, provided with notches M, and cross-bar F, with the handle I detachably connected with said spindle, and provided with the holding and tripping-pawl K and spring L, constructed substantially as specified.

2. The hopper-box B, having flange N, the guiding-shell E, with flange P, and the lower cross-bar G, all relatively arranged to be connected with the box A by the adjusting screw-bolts O, as shown and described.

3. The cone D, provided with the furrows $e$ and $b$, in combination with the shell E, provided with furrows $f$ and $b$, said cone being curved on its outer surface, and the inner wall of the shell being straight, all as and for the purpose specified.

4. The cone D, shell E, spindle C, bars F and G, screw-bolts O, and hopper B, all constructed and arranged as shown and described.

JNO. C. MILLIGAN.

Witnesses:
  GEO. W. MABEE,
  ALEX. F. ROBERTS.